(12) United States Patent
Mouri et al.

(10) Patent No.: US 11,714,062 B2
(45) Date of Patent: Aug. 1, 2023

(54) GAS SENSOR ELEMENT AND GAS SENSOR

(71) Applicant: DENSO CORPORATION, Kariya (JP)

(72) Inventors: Tomotaka Mouri, Kariya (JP); Shota Imada, Kariya (JP); Toru Takeuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 362 days.

(21) Appl. No.: 16/786,082

(22) Filed: Feb. 10, 2020

(65) Prior Publication Data

US 2020/0173957 A1 Jun. 4, 2020

Related U.S. Application Data

(63) Continuation of application No. PCT/JP2018/030770, filed on Aug. 21, 2018.

(30) Foreign Application Priority Data

Aug. 22, 2017 (JP) .................................. 2017-159692

(51) Int. Cl.
*G01N 27/407* (2006.01)
*G01N 27/406* (2006.01)
*G01N 27/409* (2006.01)

(52) U.S. Cl.
CPC ....... *G01N 27/4077* (2013.01); *G01N 27/409* (2013.01); *G01N 27/4067* (2013.01); *G01N 27/4072* (2013.01)

(58) Field of Classification Search
CPC ........... G01N 27/4077; G01N 27/4067; G01N 27/4072; G01N 27/409
See application file for complete search history.

(56) References Cited

U.S. PATENT DOCUMENTS

| 2007/0170057 | A1* | 7/2007 | Kobayashi | G01N 27/4071 204/424 |
| 2008/0028831 | A1* | 2/2008 | Nakashima | G01N 27/4077 73/31.05 |
| 2012/0297861 | A1* | 11/2012 | Murai | G01N 27/4072 73/31.05 |
| 2015/0276660 | A1* | 10/2015 | Moriyama | G01N 27/4077 156/89.12 |

(Continued)

FOREIGN PATENT DOCUMENTS

| JP | 2007-206082 | 8/2007 |
| JP | 2012-93330 | 5/2012 |
| JP | 2016-161414 | 9/2016 |

*Primary Examiner* — Joshua L Allen
*Assistant Examiner* — Vivian A Tran
(74) *Attorney, Agent, or Firm* — Nixon & Vanderhye P.C.

(57) ABSTRACT

A gas sensor element for detecting a specific gas component in a measured gas, comprising: an element body in the form of a long plate having a gas detection part at an end thereof on a distal end face side in a longitudinal direction; and a porous protective layer covering an outer periphery of the end on said end face side of the element body, wherein in a cross section including two adjacent ones of the end face and side faces connected to the end face, an outer surface of the protective layer facing an element corner where the two faces meet has a shape with a corner part, and a ratio of an assumed diameter of a water droplet contained in the measured gas in a use environment to an effective length of the corner part in the cross section is equal to or larger than 1.5.

8 Claims, 13 Drawing Sheets

(56) References Cited

U.S. PATENT DOCUMENTS

2015/0276661 A1   10/2015  Moriyama et al.
2016/0018357 A1*  1/2016  Nishijima .......... G01N 27/4067
                                                      204/424

* cited by examiner

GAS SENSOR ELEMENT AND GAS SENSOR

CROSS-REFERENCE TO RELATED APPLICATION

This application is a U.S. application under 35 U.S.C. 111(a) and 363 that claims the benefit under 35 U.S.C. 120 from International Application No. PCT/JP2018/030770 filed on Aug. 21, 2018, the entire contents of which are incorporated herein by reference. The present application is also based on Japanese Application No. 2017-159692 filed on Aug. 22, 2017, the contents of which are incorporated herein by reference.

BACKGROUND

Technical Field

The present disclosure relates to a gas sensor and a gas sensor.

Background Art

The exhaust system of an automobile engine is provided with a gas sensor for detecting a specific exhaust gas, and emission control is performed by executing, for example, combustion control based on the detection result of the gas sensor. The gas sensor has a long plate-like gas sensor element accommodated in a cover, and the gas sensor element is protected from intrusion of water droplets and poisoning substances by a porous protective layer provided on the outer surface. The gas sensor element is configured by incorporating a heater part in the element body in which a gas detection part is provided.

SUMMARY

One aspect of the present disclosure is:

A gas sensor element (1) for detecting a specific gas component in a measured gas, comprising:

an element body having a gas detection part at an end thereof on an end face side in a longitudinal direction; and a porous protective layer covering an outer periphery of the end on said end face side of the element body, wherein an outer surface of the protective layer facing an element corner where the two faces meet has a shape with a corner part, and the corner part is configured such that a ratio D/L of an assumed diameter D of a water droplet contained in the measured gas in a use environment to an effective length L of the corner part is equal to or larger than 1.5.

BRIEF DESCRIPTION OF THE DRAWINGS

The above and other objects, features, and advantages of the present disclosure will become clearer from the following detailed description with reference to the accompanying drawings. In the drawings.

DETAILED DESCRIPTION OF THE PREFERRED EMBODIMENTS

Figure 1:
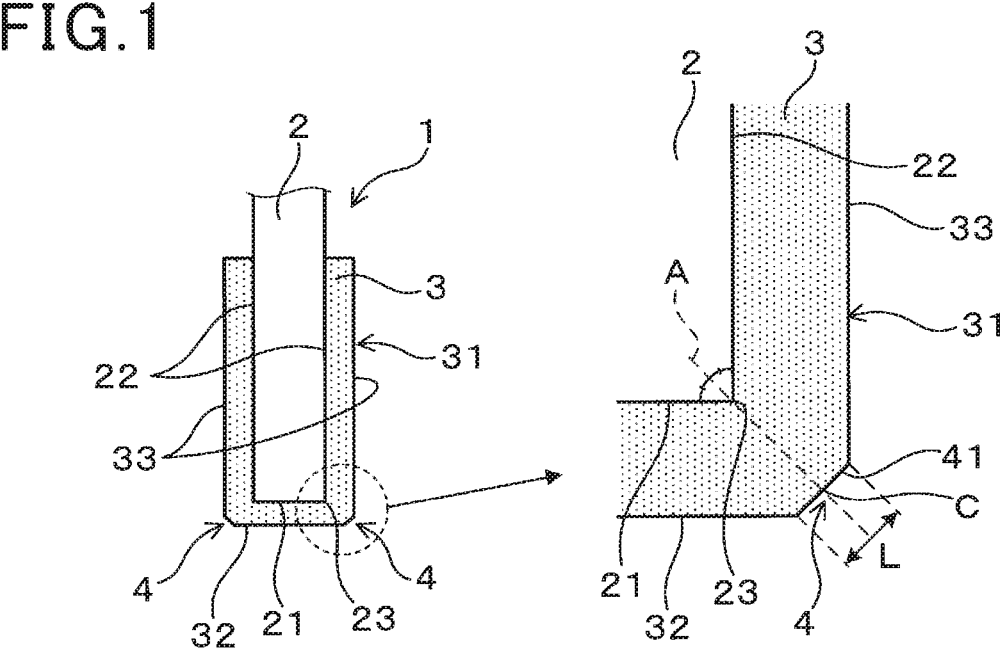
FIG. 1 shows a schematic view of a gas sensor element and an enlarged view of a main part thereof according to the first embodiment.

The inventor of the present disclosure has studied a gas sensor element and a gas sensor including a protective layer capable of achieving both responsiveness and water resistance even in an environment where water exposure is more likely to occur.

There has been known that the porous protective layer is usually formed by immersing the element body of the gas sensor element in the protective layer material in a slurry state using the dipping method or the like. The protective layer formed in such a manner surrounds the entire outer periphery of the element body with a generally circular or elliptical outer shape, and it has a curved outer surface.

Further, in JP 2016-29360 A, in order to increase the water repellency of the protective layer and suppress penetration of water droplets, it is proposed to specify the thermal conductivity of the protective layer, or a physical property indicating the relationship of the thermal conductivity, density, and specific heat to a certain numerical range.

On the other hand, in order to cope with the exhaust regulations and demands for improved fuel economy that are becoming stricter year by year, there is a need for improved responsiveness. For example, it is required to change the mounting position of the gas sensor and the diameter of the through hole of the cover so that the responsiveness is improved. However, if the diameter of the through hole of the cover is increased in order to take in the gas flow more easily, the diameter of the water droplets that enter the cover also increases. In that case, from the viewpoint of water resistance, it is desirable to make the protective layer thicker. However, if the protective layer is thick, the gas flow passing through the protective layer is hindered, and the responsiveness rather decreases.

In addition, it is difficult to form a protective layer like the one described in JP 2016-29360 A to be entirely uniform, and the protective layer tends to be thin, especially at element corners where element cracking is a concern. Further, since the outer surface is curved, the contact area with water droplets increases, and thus absorption of water droplets is increased. Therefore, if the protective layer corresponding to the element corners is thickened, the entire layer thickness further increases, and improving the responsiveness has not been easy.

Thus, there is a contradicting relationship where, in order to increase responsiveness, the protective layer covering the element body is preferably thin, but in order to increase water resistance, the protective layer is preferably thick. It is desired to achieve both responsiveness and water resistance.

An object of the present disclosure is to provide a gas sensor element and a gas sensor including a protective layer capable of achieving both responsiveness and water resistance even in an environment where water exposure is more likely to occur.

One aspect of the present disclosure is:

A gas sensor element (1) for detecting a specific gas component in a measured gas, comprising:

an element body in the form of a long plate having a gas detection part at an end thereof on an end face side in a longitudinal direction; and a porous protective layer covering an outer periphery of the end on said end face side of the element body, wherein in a cross section including two adjacent ones of the end face and side faces connected to the end face, an outer surface of the protective layer facing an element corner where the two faces meet has a shape with a corner part, and the corner part is configured such that a ratio D/L of an assumed diameter D of a water droplet contained in the measured gas in a use environment to an effective length L of the corner part in the cross section including the two faces is equal to or larger than 1.5.

Another aspect of the present disclosure is:

A gas sensor comprising a cylindrical housing supporting an outer periphery of the above-described gas sensor element, and a cover body attached to one end of the cylindrical housing, wherein an end of the gas sensor element at which the protective layer is provided is housed in the cover body, and the measured gas is introduced into the cover body through a through hole provided in the cover body.

According to the gas sensor element having the above configuration, the protective layer covering the element body has a corner part corresponding to an element corner, and the ratio of the assumed diameter of the water droplets to the effective length (which represents the size of the corner part) in a certain cross section is equal to or smaller than a certain value. Specifically, it has been found that, when this ratio is equal to or larger than 1.5, water droplets reaching the surface of the gas sensor element split when they contact with the corner parts. Thus, since the split water droplets move away from the corners and the amount of water droplets absorbed by the corner parts is greatly reduced, it is possible to reduce the amount of water droplets reaching the element corners located inside the corner parts.

Thus, by providing certain corner parts corresponding to the element corners, the water exposure stress of the protective layer is reduced, and the water resistance can be improved without increasing the thickness of the protective layer. A gas sensor employing such a gas sensor element can be relieved of the restrictions on the arrangement and size of the through holes of the cover body for protection of the gas sensor element. For example, the diameter of the through holes of the cover body can be increased to increase the amount of gas introduced. Therefore, the specific gas component in the measured gas can be detected with high responsiveness.

Thus, according to the above aspects, it is possible to provide a gas sensor element and a gas sensor including a protective layer capable of achieving both responsiveness and water resistance even in an environment where water exposure is likely to occur.

First Embodiment

Embodiments according to a gas sensor element and a gas sensor will be described with reference to FIGS. 1 to 6. The gas sensor element 1 shown in FIGS. 1 and 2 constitutes the main part of the gas sensor S shown in FIG. 3, and it is inserted into a cylindrical insulator I such that its outer periphery is supported by the cylindrical housing H. The gas sensor S can be applied to, for example, an exhaust gas purification system for an automobile engine, and the gas sensor element 1 detects a specific gas concentration in the exhaust gas which is the gas to be measured. Specifically, it can be used for an oxygen sensor for detecting oxygen concentration, an air-fuel ratio sensor for detecting the air-fuel ratio (i.e., A/F) based on oxygen concentration, and the like.

Figure 2:
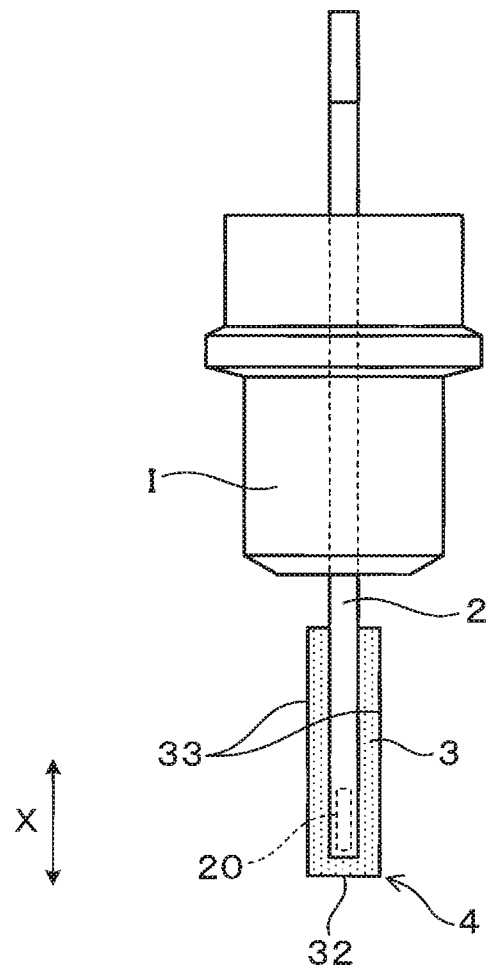
FIG. 2 is an overall schematic view of the gas sensor element according to the first embodiment.
Figure 4:
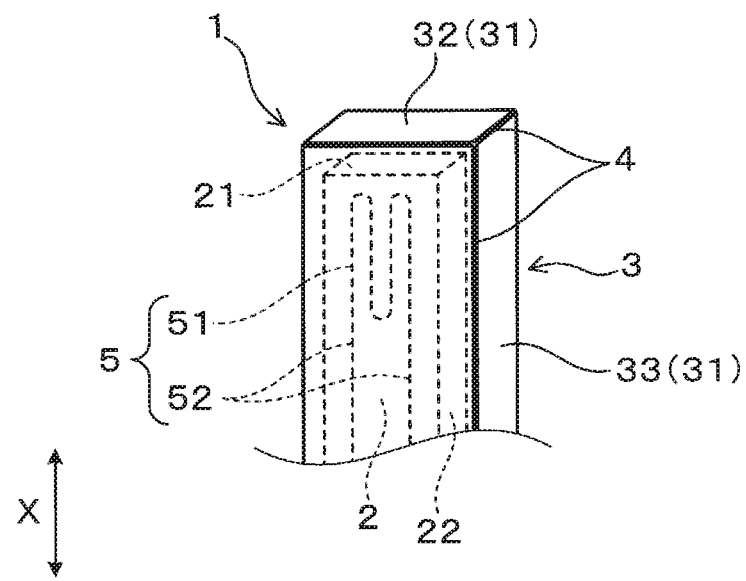
FIG. 4 is an enlarged perspective view showing the configuration of the main part of the gas sensor element according to the first embodiment.

In FIGS. 1 and 2, the gas sensor element 1 includes a long plate-like element body 2 and a porous protective layer 3 protecting the surface of the element body 2. The element body 2 is held inside the insulator I, and its longitudinal direction (that is, the vertical direction in FIG. 2) X corresponds to the axial direction of the insulator I. It comprises the gas detection part 20 at the end thereof on the side of the distal end face 21 (see, for example, FIG. 1) which is one of its end faces in the longitudinal direction X. For example, as shown in FIG. 4, the element body 2 can have a rectangular parallelepiped shape with a rectangular cross section.

The protective layer 3 is provided so as to cover the outer periphery of the end of the element body 2 on the side of the distal end face 21 protruding from the insulator I. In a cross section including two adjacent faces of the distal end face 21 of the element body 2 and the side faces 22 thereof connected to the distal end face 21, the outer surface 31 of the protective layer 3 facing the element corner 23 where the two faces intersect has a shape with a corner part 4. For example, an enlarged vertical cross section shown in FIG. 1 shows an element corner 23 where the distal end face 21 and one side face 22 connected thereto intersect with each other. Outside of it, a corner part 4 having an effective length L is provided on the outer surface 31 where an end face 32 and a side face 33 of the protective layer 3 intersects. Preferably, each corner part 4 of the protective layer 3 is located on an extension of a line A that bisects the element corner 23 of the element body 2.

For example, the gas sensor S is attached to an exhaust gas pipe and used in an environment exposed to the exhaust gas which is the gas to be measured. The protective layer 3 covering the element body 2 of the gas sensor element 1 protects the element body 2 from condensed water and poisoning substances contained in the exhaust gas. By setting the shape and size of the corner parts 4 of the protective layer 3 appropriately, in particular, setting them such that the ratio D/L of the assumed diameter D of the water droplets W (for example, see FIG. 5) contained in the exhaust gas in the use environment to the effective length L of the corner parts 4 is equal to or greater than 1.5, it is possible to split the water droplets W in contact and improve the water resistance. Here, the effective length L satisfies L>0.

Specifically, each corner part 4 has a water droplet contact surface 41 on the surface located outside the element corner 23. The water droplet contact surface 41 is a surface including, in a cross section including two adjacent faces of the element body 2, an intersection c between an extension line of the line A that bisects the element corner 23 and the outer surface 31 of the protective layer 3, and it splits a water droplet W in contact with the vicinity of the intersection c. The effective length L of the corner parts 4 can be the distance between both ends of the water droplet contact surface 41 in a cross section including two faces.

The detailed configurations of the protective layer 3 and the corner parts 4 formed in the gas sensor element 1 will be described later.

Figure 3:
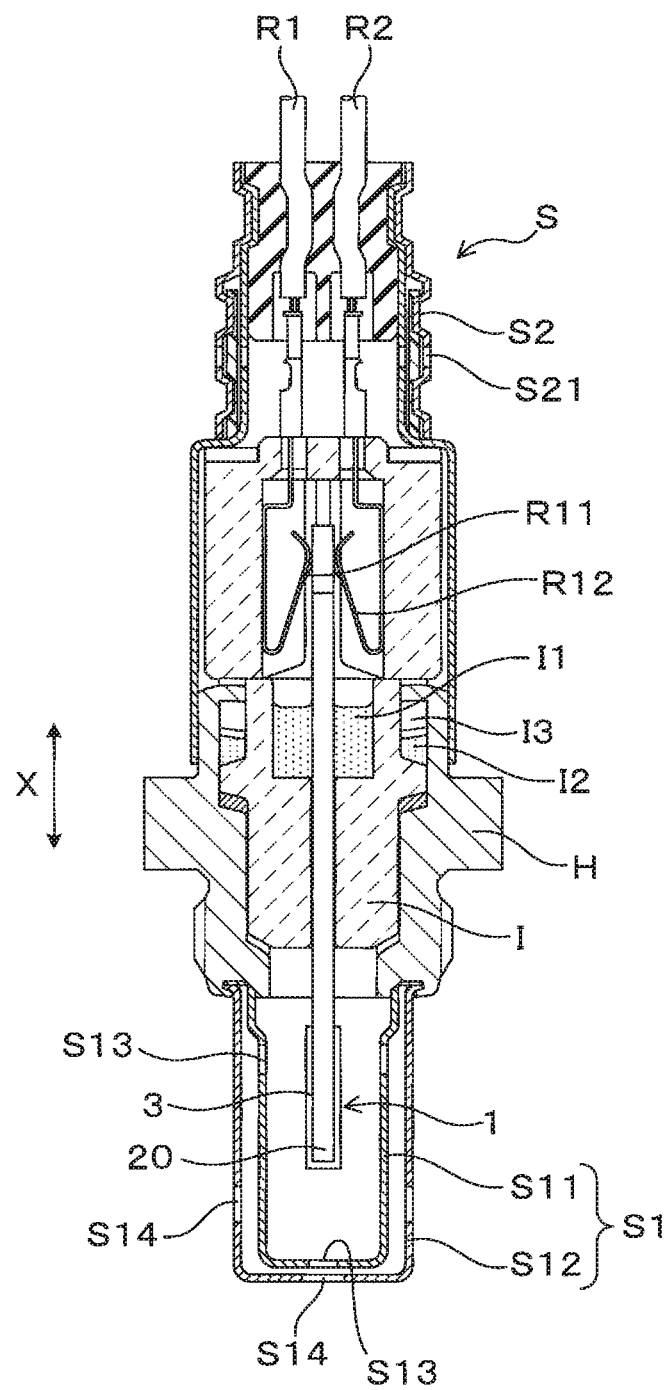
FIG. 3 is an overall cross-sectional view of a gas sensor comprising the gas sensor according to the first embodiment.

In FIG. 3, the gas sensor S has a cylindrical housing H whose axial direction is the longitudinal direction X of the gas sensor element 1 (that is, the vertical direction in the figure), and the gas sensor element 1 is inserted and held in the housing H. In the gas sensor S, one end side of the gas sensor element 1 having the gas detection part 20 is referred to as the distal end side (that is, the lower end side in the drawing), and the opposite side is referred to as the base end side (that is, the upper end side in the drawing). An element cover S1 as a cover body is attached to the distal end side of the housing H, and the distal end of the gas sensor element 1 protrudes from the housing H and is accommodated in the element cover S1. Similarly, an atmosphere side cover S2 is attached to the base end side of the housing H (that is, the upper end side in the drawing), and the base end of the gas sensor element 1 protrudes from the housing H and is accommodated in the atmosphere side cover S2.

The element cover S1 is in the form of inner and outer-doubled and bottomed cylinders, and is arranged so as to surround the periphery of the distal end of the gas sensor element 1. The inner cover S11 and the outer cover S12 of the element cover S1 are provided with through holes S13 and S14 serving as exhaust gas entry/exit holes on the side faces and the bottom face, respectively. When the exhaust gas that has passed through the through holes S13 and S14 reaches the surface of the gas sensor element 1, it is taken into the interior via the protective layer 3. The cylindrical atmosphere-side cover S2 is provided with a through hole S21 that opens at the outer peripheral side face to serve as an atmosphere hole, and takes in atmospheric air.

The outer periphery of the intermediate part of the gas sensor element 1 is held inside the cylindrical insulator I accommodated in the housing H, and sealing glass I1 is filled between the opening of the insulator I on the base end side and the gas sensor element 1. The intermediate large-diameter part of the insulator I is supported on a stepped part of the housing H, and talc powder I2 is filled between the outer peripheral surface of the insulator I and the inner peripheral surface of the housing H. Then, the thinned part of the base end of the housing H is crimped interposing a cylindrical insulating member I3 in order to fix the insulator.

A plurality of lead wires R1 and R2 connected to an external engine control unit (not shown) are insulated and held at the base end opening of the atmosphere-side cover S2. Terminal parts R11 and R12 are provided on the distal end side of the lead wires R1 and R2, and are electrically connected to electrode terminal parts (not shown) provided at the base end of the gas sensor element 1. Further, as shown in FIG. 4, the gas sensor element 1 includes a heater part 5 incorporated in the element body 2 on the distal end face 21 side. The heater part 5 includes a heater electrode 51 and a lead part 52 for energization. The heater electrode 51 is caused to generate heat by external energization, so that the portion corresponding to the gas detection part 20 of the element body 2 is activated at an activation temperature.

Figure 6:
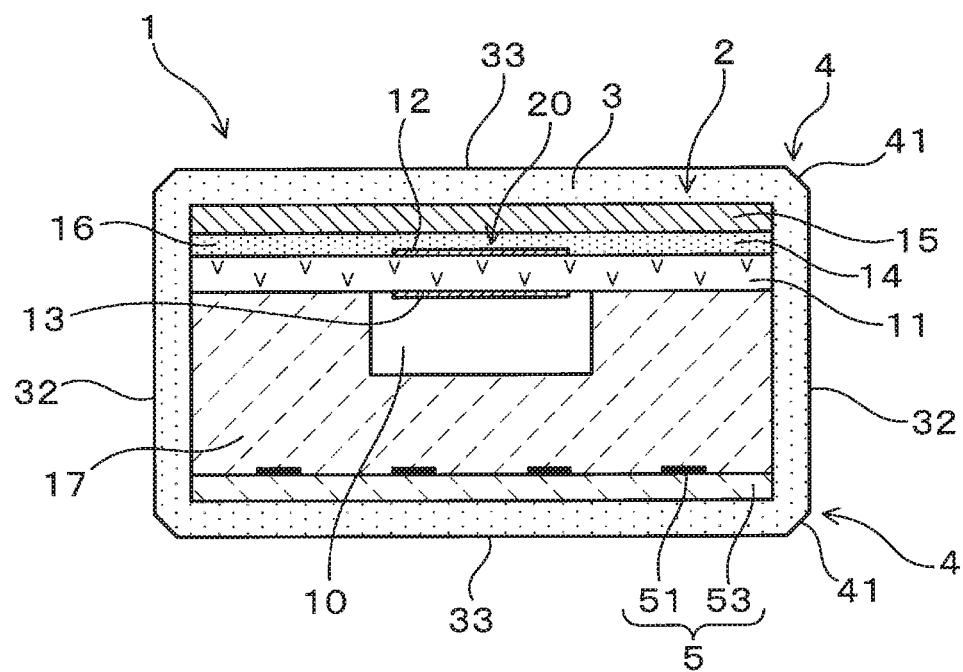
FIG. 6 is a cross-sectional view showing the structure of a gas detection part of the gas sensor element according to the first embodiment.

In FIG. 6, the gas detection part 20 of the gas sensor element 1 comprises, for example, an oxide-ion-conductive solid electrolyte body 11, a measured-gas-side electrode 12 provided on the surface of the solid electrolyte body 11 on the measured gas side and into which the gas to be measured is introduced via a porous diffusion resistance layer 14, and a reference-gas-side electrode 13 provided on the surface of the solid electrolyte body 11 on the reference gas side so as to face a reference gas chamber 10. The porous diffusion resistance layer 14 includes a dense shielding layer 15 laminated on its face opposite to the solid electrolyte body 11, and a gas introduction port 16 exposed on the lateral outer surface is formed.

A reference gas chamber forming layer 17 forming the reference gas chamber 10 has a heater substrate 53 laminated on the face opposite to the solid electrolyte body 11, and the heater electrode 51 is embedded in the heater substrate 53 to constitute the heater part 5. The element body 2 is formed by sequentially laminating the heater substrate 53, the reference gas chamber forming layer 17, the solid electrolyte body 11, the porous diffusion resistance layer 14, and the shielding layer 15.

Although the element body 2 has a rectangular cross-sectional shape in this example, it may have a polygonal cross-sectional shape. For example, instead of making the side edge parts on the gas detection part 20 side or the heater part 5 side right-angled corners as shown in the figure, they may have inclined faces inclined with respect to the lamination direction so as to form a cross-sectional shape of a hexagon, an octagon, etc. In such a case as well, the corner parts 4 of the protective layer 3 are formed corresponding to the element corners 23.

The protective layer 3 is made of a porous body in which a large number of pores exist between ceramic particles, and is adjusted to have a desired porosity. The ceramic particles are made of, for example, an insulating ceramic such as alumina. The solid electrolyte body 11 is made of, for example, a zirconia-based solid electrolyte, and the heater substrate 18, the reference gas chamber forming layer 17, the solid electrolyte body 11, the porous diffusion resistance layer 14, and the shielding layer 15 are made of, for example, an insulating ceramic such as alumina or spinel.

Thus, when the exhaust gas is introduced to the measured-gas-side electrode 12 via the porous diffusion resistance layer 14, and a certain voltage is applied between the measured-gas-side electrode 12 and the reference-gas-side electrode 13 on the side of the reference gas chamber 10 into which the atmospheric air is introduced, the sensor output of the gas detection part 20 gives a sensor output exhibiting limiting current characteristics corresponding to the oxygen concentration. By utilizing this, an air-fuel ratio signal corresponding to the oxygen concentration in the exhaust gas can be obtained.

Next, the detailed structure of the protective layer 3 will be described.

In the left diagram of FIG. 1, the protective layer 3 is has a substantially uniform thickness and covers the outer periphery of the end part of the element body 2 on its distal end face 21 side. That is, the protective layer 3 covers the entire distal end face 21, and also covers the end parts of the of side faces 22 connected thereto. The corner parts 4 are formed at locations where the end face 32 positioned distal to the distal end face 21 meets with the side faces 33 positioned aside the side faces 22. The outer shape of the protective layer 3 is generally similar to the outer shape of the element body 2, and the protective layer 3 is larger than the element body 2 by the thickness of itself.

Specifically, in FIG. 4, regarding the end face 32 of the protective layer 3 corresponding to the distal end face 21 of the element body 2, and the side faces 33 connected to the end face 32, a corner part 4 is formed between every two adjacent faces of the end face 32 and the side faces 33. For example, in the rectangular end face 32 of the protective layer 3, along the connection parts between the four sides of the outer peripheral edges and the edges of the four side faces 33 connected to the four sides, corner parts 4 are formed extending linearly in directions orthogonal to the longitudinal direction X. Similarly, in each rectangular side face 33 of the protective layer 3, along every connection part between lateral edges of two adjacent side faces, a corner part 4 is formed extending linearly in the longitudinal direction X.

Figure 5:
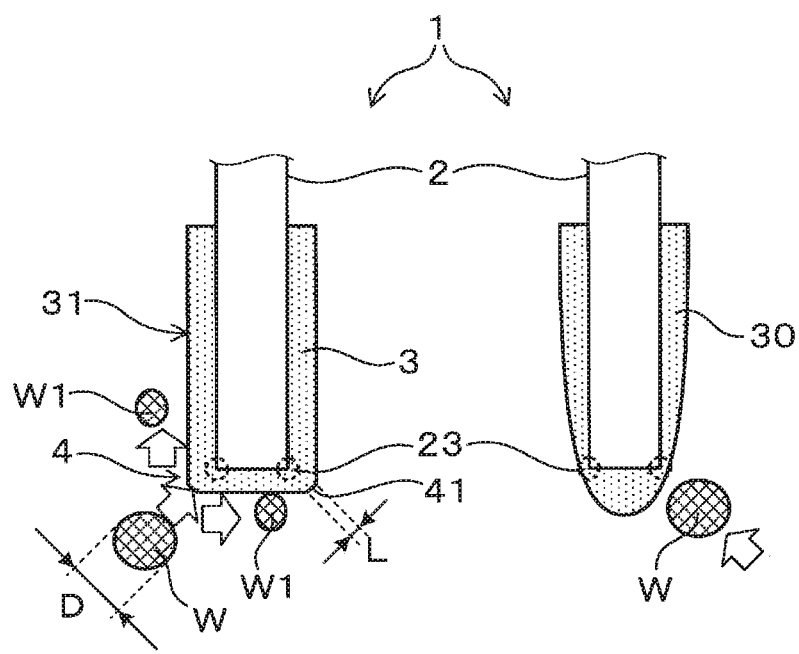
FIG. 5 is a schematic view for explaining the operation and effect of the gas sensor element according to the first embodiment in comparison with the conventional configuration.

As schematically shown in the left diagram of FIG. 5, a water droplet W can be split at the corner part 4 by reducing the water droplet contact surface 41 of the corner part 4 enough with respect to the water droplet W reaching the surface of the gas sensor element 1. Specifically, this effect can be obtained when the ratio D/L between the assumed diameter D of the water droplet W and the effective length L of the corner part 4 (for example, the distance between the two ends of the water droplet contact surface 41) is 1.5 or greater. As a result, the water droplets W1 split from the water droplet W move away from the water droplet contact surface 41, and absorption of the whole amount of the water droplet W at the corner part 4 can be prevented. Accordingly, it is possible to significantly reduce the water exposure stress, and to protect the element corners 23 which are weakest against water exposure, thereby obtaining an effect of preventing element cracking.

Figure 7:
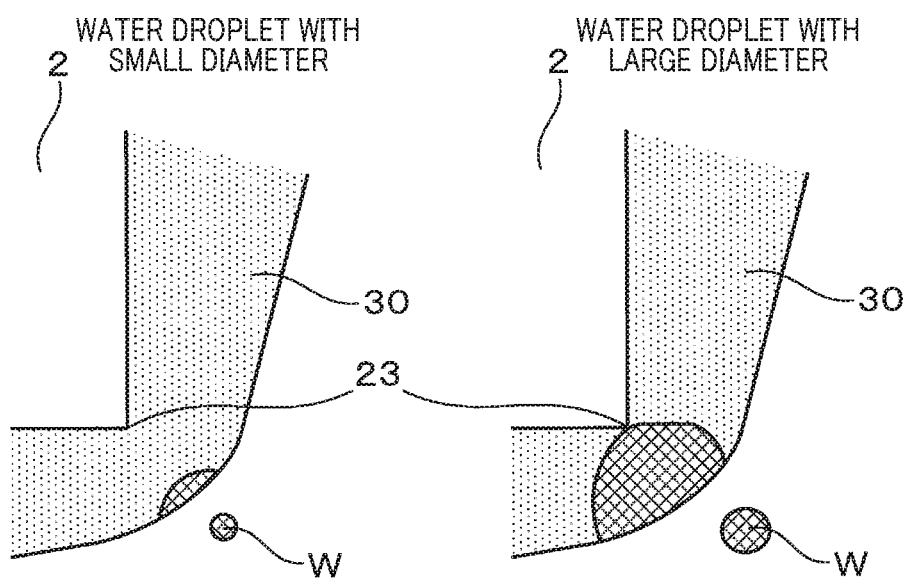
FIG. 7 is a schematic view showing a state where the protective layer and a water droplet are in contact with each other according to a conventional gas sensor element.

On the other hand, as shown in comparison with the right diagram of FIG. 5, in the gas sensor element 1 provided with the conventional protective layer 30, the outer surface of the protective layer 30 is entirely curved. In that case, the contact area with a water droplet W reaching the outer surface of the protective layer 30 increases, and not only water droplets W are easily absorbed, but also the layer thickness is reduced at portions corresponding to the element corners 23. Therefore, as shown in the left diagram of FIG. 7, if the diameter of the water droplet W adhering to the protective layer 30 is small, even if the entire amount is absorbed, it does not reach the element body 2. However, as shown in the right diagram of FIG. 7, if the diameter of the water droplet W increases, the absorbed water droplet W tends to reach the element corner 23 where the layer is thin.

When the gas sensor S is in operation, the heater 5 of the gas sensor element 1 shown in FIG. 4 is energized to raise the temperature up to the activation temperature of the gas detection part 20, and the surface temperature of the protective layer 3 is, for example, 400° C. to 600° C. If a large water droplet W adheres thereto and permeates into the inside from the outer surface 31, a difference in thermal expansion occurs in the protective layer 3, and stress concentrates on the element corner 23, which may cause element cracking.

To address this problem, the outside of the element corners 23 of the gas sensor element 1 is covered with the protective layer 3 having the corner parts 4, and preferably, the water droplet contact surface 41 of each corner part 4 is located on the extension line of the line A that bisects the corresponding element corner 23 to split the water droplets W. Thus, the water droplet contact surface 41 suffices if it has a size corresponding to the assumed water droplets W, and the element corners 23 can be reliably protected by arranging them so as to correspond to the element corners 23 of the element body 2.

Such a protective layer 3 can be manufactured by a molding method as will be described later.

Specific examples of the shape of these corner parts 4 will be described with reference to FIGS. 8 to 10.

Figure 8:
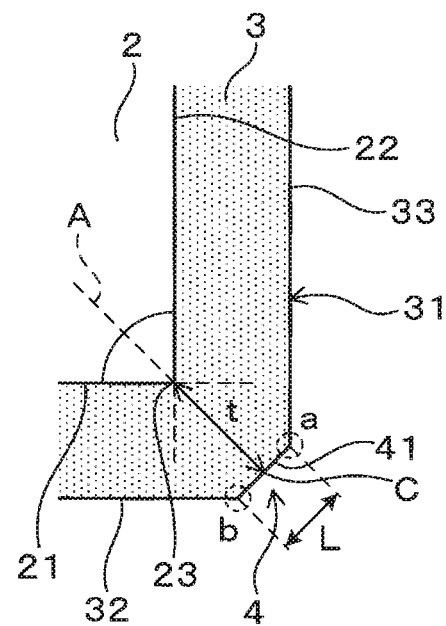
FIG. 8 is an enlarged cross-sectional view of the main part showing the configuration of the protective layer of the gas sensor element according to the first embodiment.

As shown in FIG. 8, the corner parts 4 of the protective layer 3 may have a C surface shape, for example. The water droplet contact surface 41 of each corner part 4 is a generally flat surface located on the extension line of the line A that bisects the corresponding element corner 23 located inside thereof, and including an intersection c between the extension line of the line A and the outer surface 31 of the protective layer 3. The water droplet contact surface 41 has a shape change point a that bends in a direction toward the side face 22 of the element body 2 with respect to the intersection point c, and also has a shape change point b that bends in a direction toward the distal end face 21 side.

The shape change points a and b are the two end points of the water droplet contact surface 41 as shown in the vertical cross section shown in FIG. 8, and the linear distance between the shape change points a and b is the effective length L for when the water droplet W contacts with the corner part 4. As the shape change point a or the shape change point b approaches the intersection point c, the effective length L decreases, and thus the corner part 4 becomes smaller. The intersection point c may coincide with the shape change point a or the shape change point b, or may be at a position that substantially coincides with both the shape change points a and b. In that case, the effective length L of the corner part 4 is extremely small.

The outer surface 31 of the protective layer 3 may have a shape having a plurality of shape change points from the intersection c toward the end face 32 side or the side face 33 side of the protective layer 3. In this case as well, the water droplet contact surface 41 is defined by the shape change points a and b closest to the intersection c. It should be noted that, preferably, to bend in a direction toward the distal end face 21 or the side face 22 means that the bending angle is around 150° or smaller at the bent part where flat surfaces meet as shown in FIG. 8, and the bent part may be defined as a shape change point. Further, the outer surface 31 of the end face 32 or the side faces 33 of the protective layer 3 does not need to be formed only by a flat surface.

FIG. 8 shows one cross section of the corner part 4 where the end face 32 and one side face 33 of the protective layer 3 intersect. However, a similar water droplet contact surface 41 is formed in the other cross sections of the continuous corner part 4. Further, a water droplet contact surface 41 having an effective length L is also formed at the corner parts 4 where the end face 32 and the other side faces 33 meet or where the side faces 33 meet with each other. Preferably, for each of the corner part 4, the effective length L of the water droplet contact surface 41 is set so that the ratio D/L with respect to the assumed diameter D of the water droplets W expected to reach the corner part 4 together with the exhaust gas in the use environment is 1.5 or greater. The effective lengths L of the corner parts 4 of the protective layer 3 may be generally the same or different from each other. Further, although the cross-sectional shape and effective length L of one continuous corner part 4 are preferably generally constant, they may be partially different.

Figure 9:
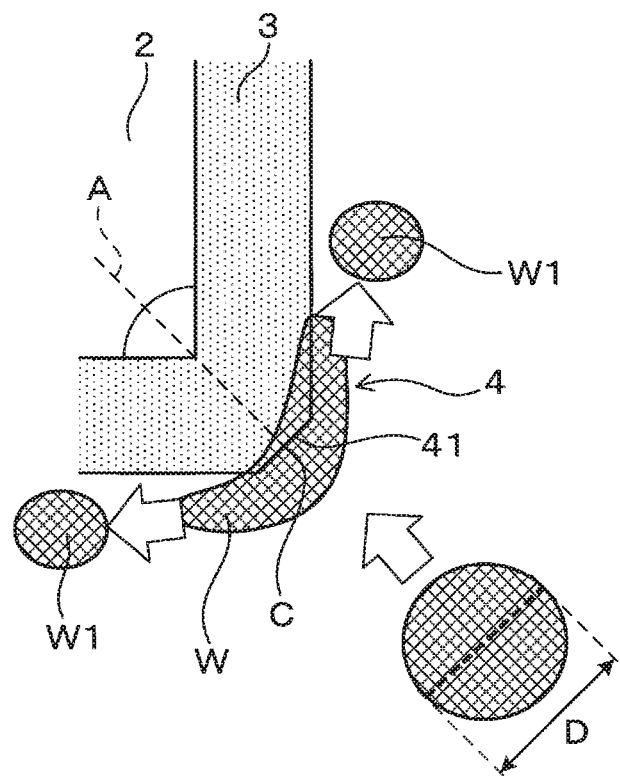
FIG. 9 is an enlarged cross-sectional view of the main part for explaining the operation and effect of the protective layer of the gas sensor element according to the first embodiment.

As shown in FIG. 9, when a water droplet W having an assumed diameter D collides with the water droplet contact surface 41 of the corner 4, the effect of splitting the water droplet W can be obtained when the ratio D/L is 1.5 or greater. The larger the ratio D/L is than 1.5, for example, when a certain assumed diameter D is set, the smaller the effective length L of the corner part 4 is, the smaller the contact area with the water droplet W, and the higher the effect of splitting the water droplet W. In addition, since the water droplet contact surface 41 is smaller as compared with the size of the water droplet W, the amount of a water droplet absorbed by the corner part 4 is reduced, and split water droplets W1 having smaller diameters rapidly leave the water drop contact surface 41 of the corner part 4. Thus, the amount of water exposure can be greatly reduced.

In the use environment where the gas sensor S is placed, the size of the water droplets W reaching the gas sensor element 1 is normally limited by the through holes S13 and S14 of the element cover S1 in which the gas sensor element 1 is accommodated. That is, the assumed diameter D of the water droplets W reaching the gas sensor element 1 is determined depending on the size of the hole diameters of the through holes S13 and S14 of the element cover S1 and the clearance of the inner cover S11 and the outer cover S12, and normally, it is larger than the minimum diameter of the through holes S13 and S14. When the gas sensor S is required to have good responsiveness, the diameters of the through holes S13 and S14 tend to increase, and the assumed diameter D also increases. Therefore, for each gas sensor S, it is preferable to set the assumed diameter D based on, for example, predicted values and test values of the average diameter or the maximum diameter of the water droplets W passing through the element cover S1 and according to the use environment. Further, based on the assumed diameter D, the shape of the water droplet contact surface 41 of the corner parts 4 can be set so that a certain ratio D/L is achieved.

The ratio D/L is preferably 2.0 or greater, and the effective length L of the corner part 4 is preferably smaller than 1.0 mm. For example, in the case of a general gas sensor S used in an exhaust gas purification system, if the corner part 4 is formed to have an effective length L that is smaller than 1.0 mm, the ratio D/L would be 2.0 or greater, and the assumed water droplets W can be split at the water droplet contact surface 41. Thus, intrusion of the water droplets W into the interior of the protective layer 3 is thus suppressed, the effect of protecting the element corners 23 is enhanced, and element cracking can be prevented.

In addition, preferably, the effective length L or the layer thickness t of the protective layer 3 are adjusted such that the ratio L/t between the effective length L of the corner part 4 and the layer thickness t of the protective layer 3 at the corner part 4 is 6 or smaller. The layer thickness t at the corner part 4 is represented by the shortest distance between the corresponding element corner 23 and the outer surface 31 of the protective layer 3, that is, the distance between the intersection c obtained by extending the line A that bisects the element corner 23 and the element corner 23. The smaller the ratio L/t below 6, the layer thickness t becomes larger relative to the effective length L of the corner part 4, and the effect of reducing the water droplets W absorbed by the corner part 4 that reach the element corner 23 can be enhanced. Further, since the effective length L of the corner part 4 becomes smaller relative to the layer thickness t, the effect of splitting the water droplet W at the corner 4 is enhanced.

Figure 10:
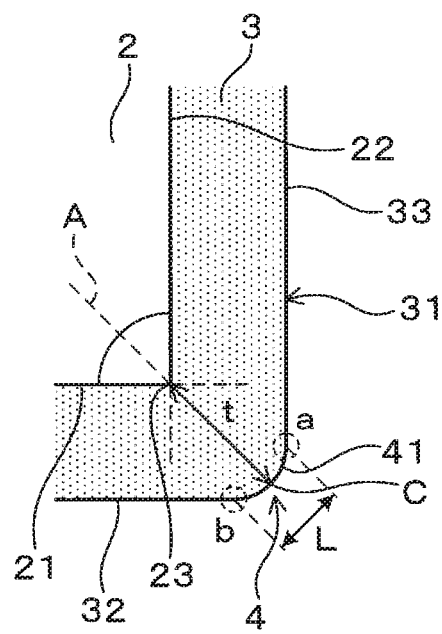
FIG. 10 is an enlarged cross-sectional view of the main part showing another example of the shape of the protective layer of the gas sensor element according to the first embodiment.

As shown in FIG. 10 as a modification example, the corner parts 4 of the protective layer 3 may have a R surface shape, for example. In this case as well, the water droplet contact surface 41 of each corner part 4 is a curved surface located on the extension line of the line A that bisects the corresponding element corner 23 located inside thereof, and including an intersection c between the extension line of the line A and the outer surface 31 of the protective layer 3. The water droplet contact surface 41 has a shape change point a at which the shape abruptly changes in a direction toward the side face 22 of the element body 2 with respect to the intersection point c, and also has a shape change point b at which the shape abruptly changes in a direction toward the distal end face 21 side. Here, the shape change points a and b are, for example, as illustrated, connection points between the curved water droplet contact surface 41 and the flat end face 32 or the flat side face 33 on the outer surface 31 of the protective layer 3.

The shape change points a and b are the two end points of the water droplet contact surface 41 as shown in the vertical cross section shown in FIG. 10, and the linear distance between the shape change points a and b is the effective length L for when the water droplet W contacts with the corner part 4. As with the case of the C surface shape, in the case of the R surface shape, as the shape change point a or the shape change point b approaches the intersection point c, the effective length L decreases, and thus the corner part 4 becomes smaller. Further, the intersection point c may coincide with the shape change point a or the shape change point b, or may be at a position that substantially coincides with both the shape change points a and b. In the case the outer surface 31 of the protective layer 3 has a shape having a plurality of shape change points between the intersection c and the end face 32 side or the side face 33 side of the protective layer 3, similarly, the water drop contact surface 41 is defined by the shape change points a and b that are closest to the intersection c.

Figure 11:
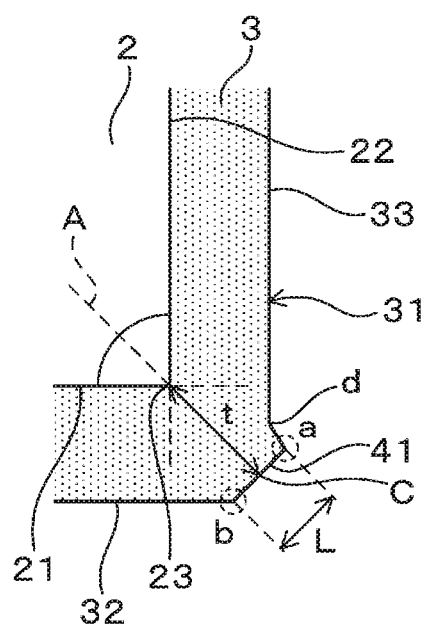
FIG. 11 is an enlarged cross-sectional view of the main part showing another example of the shape of the protective layer of the gas sensor element according to the first embodiment.

Alternatively, as shown in FIG. 11 as another modification example, the corner part 4 of the protective layer 3 may have a protruded shape that protrudes outward from the end face 32 or the side face 33. In this case as well, the corner part 4 is on the extension line of the line A that bisects the element corner 23 located inside thereof, and can be defined similarly. Specifically, the flat surface including the intersection c between the extended line A and the outer surface 31 of the protective layer 3 is the water droplet contact surface 41. The water droplet contact surface 41 has a shape change point a that bends in a direction toward the side face 22 of the element body 2 with respect to the intersection point c, and also has a shape change point b that bends in a direction toward the distal end face 21 side.

The shape change points a and b are the two end points of the water droplet contact surface 41 as shown in the vertical cross section shown in FIG. 11, and the linear distance between the shape change points a and b is the effective length L for when the water droplet W contacts with the corner part 4. As the shape change point a or the shape change point b approaches the intersection point c, the effective length L decreases, and thus the corner part 4 becomes smaller. Further, the intersection point c may coincide with the shape change point a or the shape change point b, or may be at a position that substantially coincides with both the shape change points a and b.

The outer surface 31 of the protective layer 3 may have a shape having a plurality of shape change points from the intersection c toward the end face 32 side or the side face 33 side of the protective layer 3. For example, the corner part 4 with a protruded shape as shown in the figure further has a shape change point d that bends inward in a direction heading from the shape change point a toward the side face 33. In this case as well, similarly, the water droplet contact surface 41 is defined by the shape change points a and b closest to the intersection c.

The water droplet contact surfaces 41 of the corner parts 4 shown in FIGS. 10 and 11 are also formed such that the ratio D/L between the assumed diameter D of water droplets W and the effective length L is 1.5 or greater. Advantageously, the same effects can be obtained by setting the effective length L and the layer thickness t with respect to the assumed diameter D so that the ratio L/t to the layer thickness t of the protective layer 3 is 6 or smaller.

Next, a method of manufacturing the gas sensor element 1 will be described.

Figure 12:
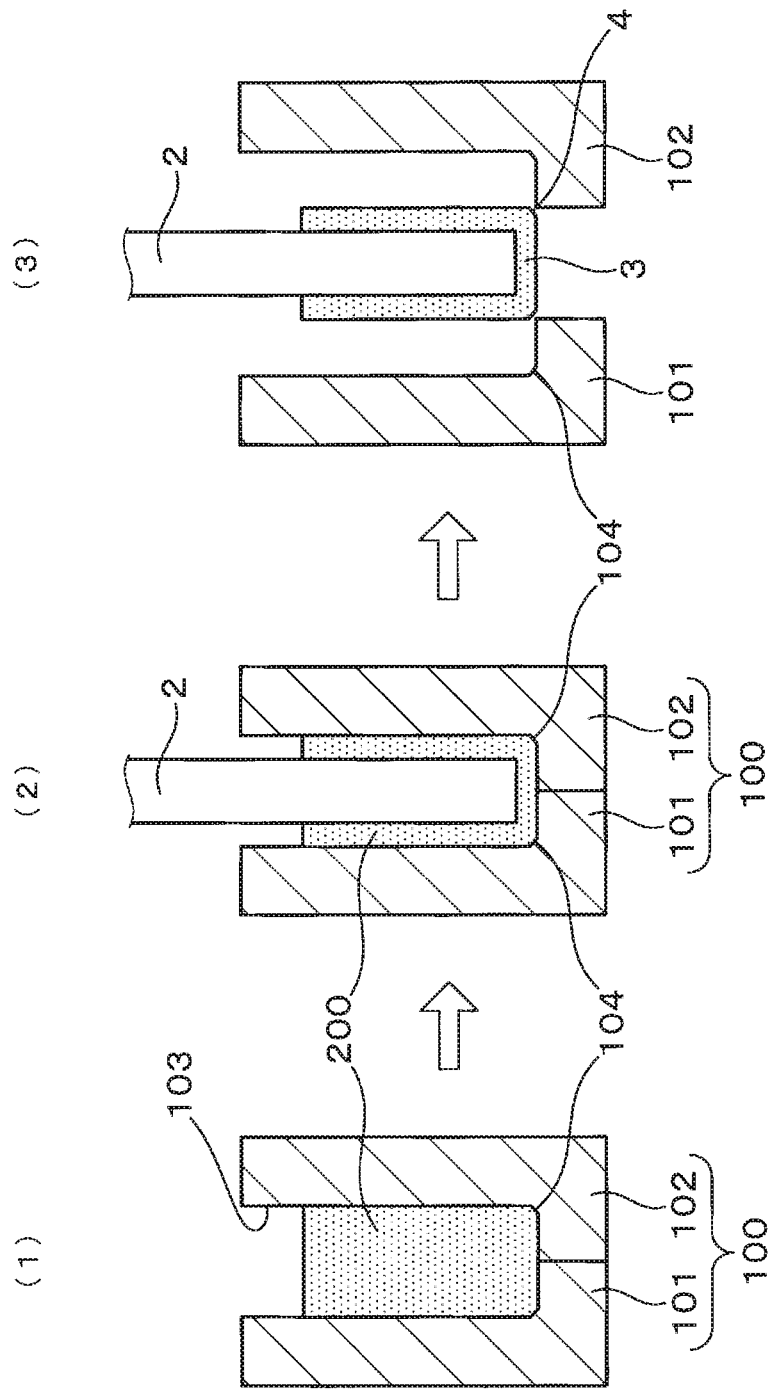
FIG. 12 is a view showing the manufacturing process of the gas sensor element according to the first embodiment.

As shown in FIG. 12, molding can be adopted as the method of providing the protective layer 3 on the surface of the element body 2. In the step shown in (1), first, a slurry 200 containing a ceramic material constituting the protective layer 3 is injected into a mold 100 in the form of a container. The mold 100 includes, for example, two molds 101 and 102 having a split structure, and the hollow part 103 formed at the abutting parts of the two molds 101 and 102 has a shape corresponding to the outer shape of the protective layer 3. Here, the inner peripheral edges of the bottoms of the two molds 101 and 102 are formed to form a C surface shape, so that they form the shape of the corner parts 104 which are inclined inward from the inner side faces toward the bottom face.

The slurry 200 is a protective-layer-forming material prepared by adding an inorganic binder, a coagulant, and/or the like to the ceramic material for constituting the protective layer 3. In the step shown in (2), the element body 2 is inserted from the upper opening of the hollow part into the mold 100 in which the slurry 200 has been injected, and the slurry 200 is temporarily cured after positioning and holding the element body with a jig or the like (not shown). After that, in the step shown in (3), the two molds 101 and 102 are opened to take out the element body 2 covered with the temporarily-cured slurry 200, and the element body is baked (for example, at 1000° C.) to form the protective layer 3.

Other than heat drying, the curing may be performed by adding a curing agent such as a UV resin or a thermosetting resin to the slurry 200 and performing UV irradiation or heating. As described above, when molding is employed, since the corner parts 104 having a shape corresponding to the corner parts 4 of the protective layer 3 can be provided in the mold 100 in advance, a protective layer 3 having corner parts 4 with a desired shape can be formed with high accuracy. Alternatively, it is also possible to employ a mold 100 that does not have corner parts 104 with a C surface shape, and forming the corner parts 4 by cutting the protective layer 3 after forming it into any desired shape.

Test Example 1

Samples of the gas sensor element 1 manufactured by the above-described method was tested to evaluate the influence of the shape of the corner parts 4 of the protective layer 3 on the water resistance. Samples of the gas sensor element 1 were prepared so that the corner parts 4 of the protective layer 3 have a C surface shape (see, for example, FIG. 9), and so that they have different effective lengths L, and the following water exposure test was performed. The ratio D/L between the effective length L of the corner part 4 and the assumed diameter D of the water droplet W was changed by combining the effective length with two types of water droplet amounts corresponding to the assumed diameters D of the water droplet W.

Figure 13:
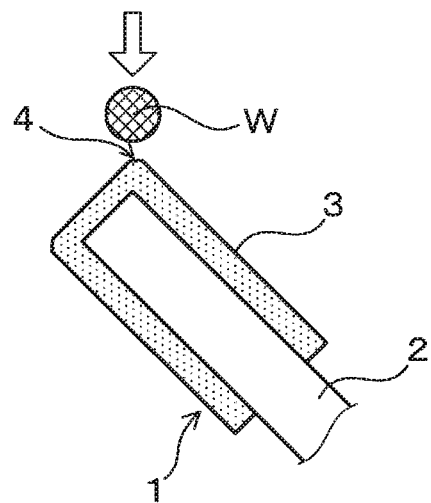
FIG. 13 is an enlarged cross-sectional view of the main part of the gas sensor element for explaining the method of the water exposure test performed in Test Example 1.

As shown in FIG. 13, in the water exposure test, the gas sensor element 1 was fixed with a jig (not shown) so that the corner part 4 of the protective layer 3 is located at the upper end, and after heating it to a certain controlled temperature by energizing the heater part 5, a predetermined amount of water droplets W was dropped onto the corner part 4 from above. The controlled temperature provided by the heater 5, the thickness of the protective layer 3 of the gas sensor element 1, the longitudinal length of the protective layer 3, the bending angles at the two ends of the water droplet contact surface 41 of the corner part 4, and the dimension of the element body 2 were as follows.

Layer thickness of protective layer 3: 0.15 mm
Longitudinal length of protective layer 3: 10 mm
Bending angle of corner part 4: 150°
Controlled temperature: 750° C.
Longitudinal length of element body 2: about 50 mm The evaluation was performed using a high-speed camera (for example, high-speed camera condition: 10000 fps) to visually determine whether the droplet W has split, setting the dropping amount of the water droplet W (that is, the droplet amount) to 2 μL or 3 μL and varying the effective length L of the corner part 4 from 0.82 mm to 1.22 mm.

The droplet diameter corresponding to the droplet amount was regarded as the assumed diameter D to calculate the ratio D/L. The relationship of the ratio with the splitting of the water droplet W was examined, and the results are shown in Table 1 (i.e., Examples 1 to 3, Comparative Examples 1 and 2). When all of the water droplet W was absorbed by the protective layer 3, it was judged that it did not split, and when a part of the water droplet W was not absorbed by the protective layer 3, it was judged that it split.

Further, for each of Examples 1 to 3 and Comparative Examples 1 and 2, the IL change ratio of the gas sensor element 1 between before and after the water exposure test was examined, and the results are also shown in Table 1. The IL change ratio was obtained by measuring the sensor current IL output from the gas detection part 20 using a test gas having a certain gas composition on the gas sensor element 1, and calculating the change ratio of the sensor current IL between before and after the water exposure test. The evaluation was defined as follows.

IL change ratio is larger than 10%: Unacceptable
IL change ratio is larger than 5% and equal to or smaller than 10%: Acceptable
IL change ratio is equal to or smaller than 5%: Excellent The IL change ratio is a parameter for determining the degree of element cracking due to moisture. When element cracking occurs, the amount of gas flowing into the gas detection part 20 increases and the sensor current IL increases. However, since it can be considered that the sensor current IL has a measurement variation of up to about 10%, taking this into consideration, cases where the IL change ratio exceeds 10% were regarded as unacceptable. Further, when the IL change ratio was equal to or smaller than 5%, it was assumed that there was almost no increase in the sensor current IL, and the sample was evaluated to be excellent, and when the increase was within the range of measurement variation, the sample was evaluated as acceptable.

TABLE 1

| Ex., Comparative Ex. No. | Droplet amount µL | Droplet diameter (D) [mm] | L [mm] | D/L | IL change ratio | Droplet splitting |
|---|---|---|---|---|---|---|
| Comparative Ex. 1 | 2 | 1.57 | 1.21 | 1.30 | Acceptable | No |
| Comparative Ex. 2 | 3 | 1.79 | 1.22 | 1.47 | Unacceptable | No |
| Ex. 1 | 3 | 1.79 | 1.01 | 1.77 | Acceptable | Yes |
| Ex. 2 | 3 | 1.79 | 0.91 | 1.97 | Excellent | Yes |
| Ex. 3 | 3 | 1.79 | 0.82 | 2.18 | Excellent | Yes |

As can be seen from Table 1, regarding Comparative Examples 1 and 2 which have ratios D/L that are smaller than 1.5, and effective lengths L of the corner part 4 equal to or larger 1.2 mm which are relatively large with respect to the water droplet W, the water droplet W did not split. Further, in Comparative Example 1 which has a small droplet amount of 2 µL (that is, corresponds to D=1.57 mm), the IL change ratio is acceptable and within the allowable range, but in Comparative Example 2 which has a larger droplet amount of 3 µL (that is, corresponds to D=1.79 mm), the IL change ratio is unacceptable, and it is considered that element cracking occurred. On the other hand, in Examples 1 to 3, the ratio D/L is equal to or larger than 1.5, and splitting of the water droplet W was observed in all of them. The IL change ratio of Example 1, which has an effective length L of the corner part 4 that is equal to or larger than 1.0 mm, is acceptable, and the IL change ratios of Examples 2 and 3, which have effective lengths L of the corner part 4 that are smaller than 1.0 mm, are excellent.

The above results indicate that if the ratio D/L is equal to or larger than 1.5, the water droplet W can be split at the corner part 4, and even when the droplet amount is relatively large, absorption of the water droplet W can be suppressed and element cracking can be prevented. Further, the ratio D/L can be preferably set to around 2.0 or larger by making the effective length L of the corner part 4 smaller than 1.0 mm, and this promotes splitting of the water droplet W, reduces water exposure stress, and maintains an excellent IL change ratio.

Test Example 2

Figure 14:
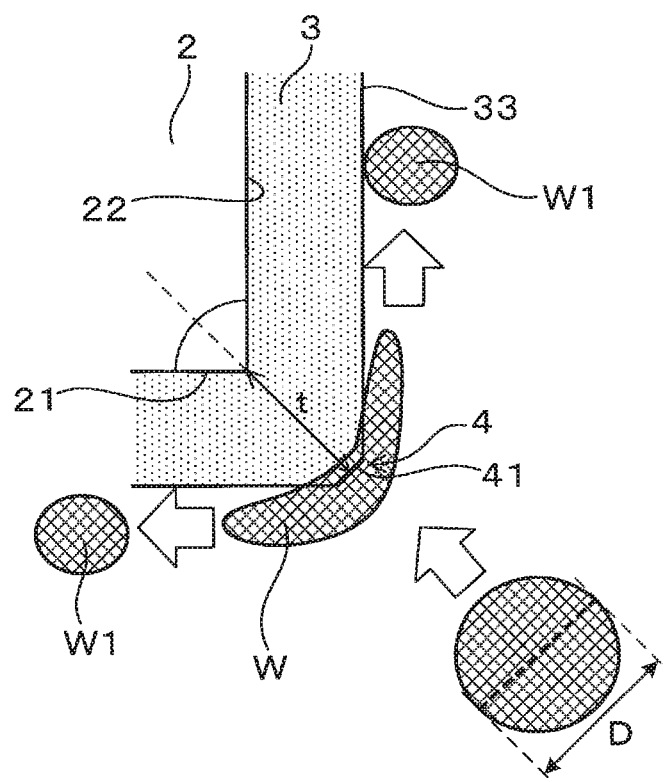
FIG. 14 is an enlarged view of the main part for explaining the configuration of the protective layer of the gas sensor element according to Test Example 1.

Next, samples of the gas sensor element 1 manufactured similarly to Test Example 1 were tested to evaluate the influence on element cracking, varying the ratio L/t between the effective length L of the corner part 4 and the layer thickness t of the protective layer 3 at the corner part 4. As shown in FIG. 14, the samples of the gas sensor element 1 were formed to have a relatively small effective length L of the corner part 4 (for example, about 0.9 mm), and the layer thickness t of the protective layer 3 was varied to vary the ratio L/t of them within a range of equal to or smaller than 10.

The water exposure test was performed similarly to Test Example 1, and whether or not element cracking occurred was determined from the IL change ratio, setting the droplet amount of the water droplet W at 3 µL. Further, when it was determined that element cracking did not occur, the water exposure was repeatedly performed gradually increasing the droplet amount until element cracking is confirmed, that is, until the IL change ratio becomes unacceptable. The results are shown in FIG. 15.

Figure 15:
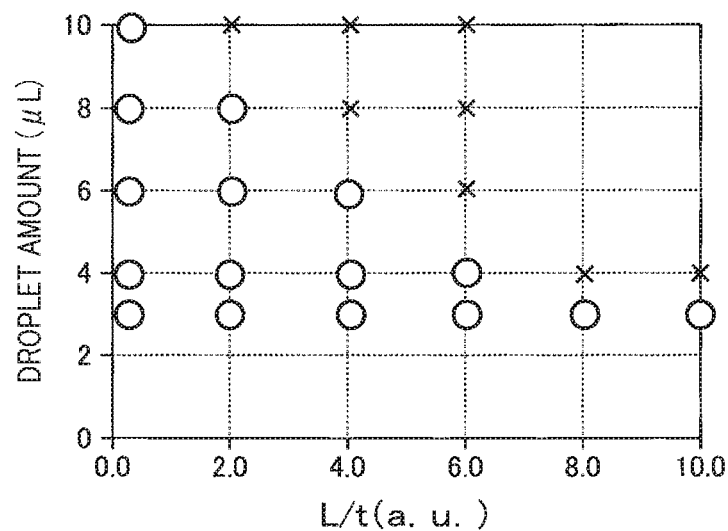
FIG. 15 is a graph showing the relationship between L/t and the amount of dropped water droplet in Test Example 1.

As can be seen from FIG. 15, when the droplet amount was 3 µL, none of the samples with a ratio L/t of 10 or smaller showed element cracking. Even when the droplet amount was increased to 4 µL, there was no element cracking in the region where the ratio L/t is equal to or smaller than 6, and sufficient water resistance could be obtained. When the droplet amount exceeds 4 µL, the smaller the ratio L/t, the larger the droplet amount that causes element cracking.

Thus, preferably, the effective length L of the corner part 4 and the layer thickness t of the protective layer 3 at the corner part 4 are adjusted so that the ratio L/t is equal to or smaller than 6. The smaller the effective length L of the corner part 4, the smaller the amount of the water droplet W absorbed into the protective layer 3. The larger the layer thickness t, the less the transfer of coldness from the water droplet W in contact with the corner part 4 to the element corner 23 inside it. Therefore, the smaller the ratio L/t, the smaller the stress on the element corner 23, and thus element cracking is suppressed and durability is improved.

Second Embodiment

The second embodiment according to a gas sensor element and a gas sensor will be described with reference to FIGS. 16 to 18. The gas sensor element 1 according to the first embodiment has a protective layer 3 with an outer shape of a rectangular parallelepiped that is substantially similar to the rectangular parallelepiped element main body 2, but the two opposing faces do not need to be arranged to be parallel. For example, the protective layer 3 may be configured such that the end face 32 or a side face 33 is inclined with respect to the distal end face 21 or a side face 22 of the element body 2, and the angle formed between the end face 32 and a side face 33 is not a right angle.

The basic structures of the gas sensor element 1 and the gas sensor S of this embodiment are the same as those of the first embodiment, and their description will be omitted.

Note that, among the reference signs used in the second and following embodiments, the same reference signs as those used in the earlier embodiment(s) denote components or the like that are similar to those of the earlier embodiment(s) unless otherwise noted.

Figure 16:
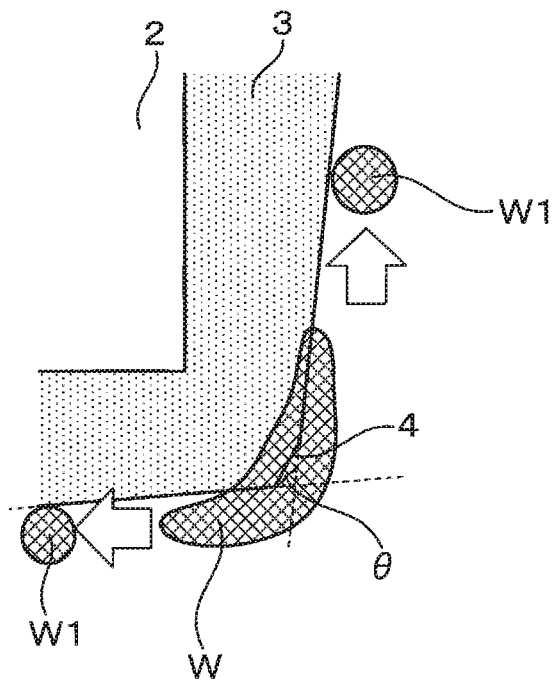
FIG. 16 is an enlarged cross-sectional view of the main part showing the configuration of the protective layer of the gas sensor element according to the second embodiment.

As shown in FIG. 16, for example, both the end face 32 and the side face 33 of the protective layer 3 may be inclined with respect to the distal end face 21 and the side face 22 of the element body 2. Here, the end face 32 and the side face 33 of the protective layer 3 are inclined so as to broaden as they move away from the corner part 4, and the angle θ formed by the end face 32 and the side face 33 is an obtuse angle. In this case as well, the same effects can be obtained by appropriately setting the effective length L of the corner part 4 with respect to the assumed diameter D of the water droplet W.

Figure 17:
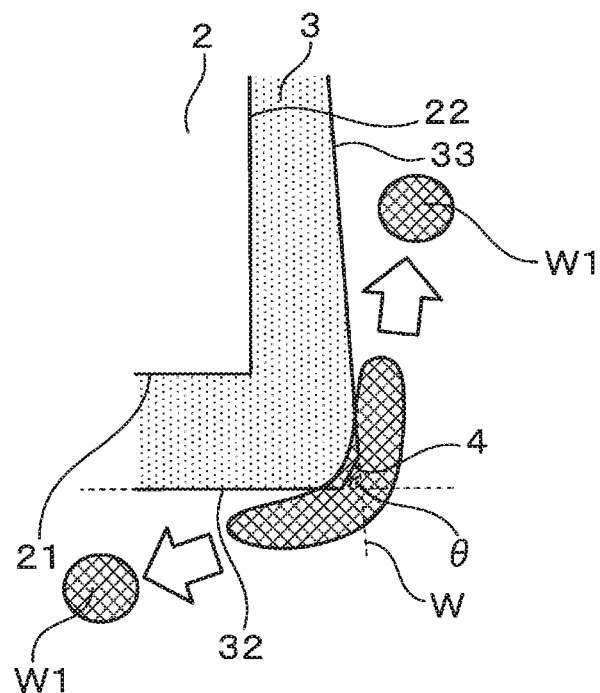
FIG. 17 is an enlarged cross-sectional view of the main part showing another example of the shape of the protective layer of the gas sensor element according to the second embodiment.

As shown as a modification example in FIG. 17, one of the end face 32 and the side face 33 may be parallel with the opposing distal end face 21 or side face 22. Here, the end face 32 of the protective layer 3 is provided in parallel with the distal end face 21 of the element body 2, and the side face 33 of the protective layer 3 is inclined with respect to the side face 22 of the element body 2. Preferably, as shown in the drawing, the side face 33 of the protective layer 3 inclined so as to broaden as it approaches the end face 32, and the angle θ formed by the end face 32 and the side face 33 is an acute angle.

Such configuration facilitates the water droplets W1 split at the corner part 4 leaving from the end face 32 or the side face 33, and also reduces the probability of the split droplets contacting with the outer surface 31 of the protective layer 3 again. In addition, since the layer thickness of the protective layer 3 increases toward the end face 32 side, it is advantageous in increasing the layer thickness t at the corner part 4 and reducing the ratio L/t. It is also possible to configure both the end face 32 and the side face 33 such that they incline so as to broaden as they approach the corner part 4.

Figure 18:
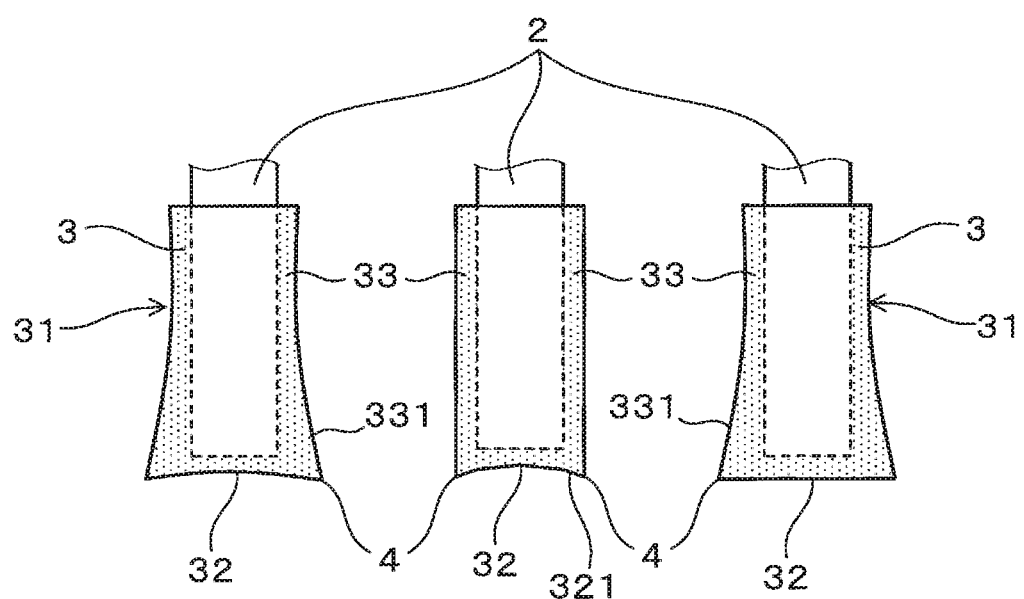
FIG. 18 is an enlarged cross-sectional view of the main part showing another example of the shape of the protective layer of the gas sensor element according to the second embodiment.

As shown as a modification example in FIG. 18, the shape of the end face 32 or the side face 33 is not limited to a flat face or an inclined face, and may be a curved face or a shape obtained by combining them. For example, in the left diagram of FIG. 18, the protective layer 3 has a curved concave end face 32. The side face 33 has a part where the outer surface 31 is a smooth curved concave surface at its end part (that is, the lower end part in the drawing) 331 on the end face 32 side. Since the corner part 4 is formed at the connection between the curved end face 32 and the end part 331 of the side face 33, and the corner part is located so as to protrude outward with respect to the end face 32 and the side face 33, the water droplets W1 split at the corner part 4 tend to move away and also they are less likely to contact with the corner part again.

As shown in the middle diagram of FIG. 18, the end face 32 can be a concave face combining a flat face and inclined faces. In this case, its end parts 321 on the side face 33 sides are inclined faces that expand toward the outside, and the corner parts 4 are formed at their connections with the side faces 33 being flat faces. Further, as shown in the right diagram of FIG. 18, the end face 32 may be a flat face, and the corner parts 4 may be formed at their connections with the end parts 331 of curved side faces 33.

Figure 19:
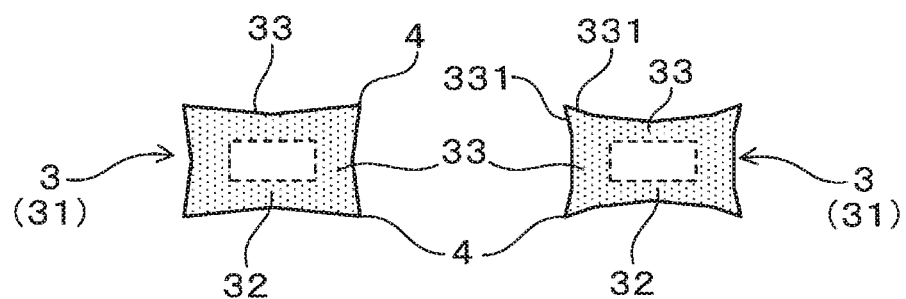
FIG. 19 is an enlarged cross-sectional view of the main part showing another example of the shape of the protective layer of the gas sensor element according to the second embodiment.

Furthermore, as shown as a modification example in the left diagram of FIG. 19, the corner part 4 at the connection of two side faces 33 may be formed by two curved concave side faces 33. As shown in the right diagram of FIG. 19, each of the two side faces 33 can be a concave face combining a flat face and inclined faces. In this case, the corner part 4 is formed at the connection between the end parts 331 of the two side faces 33 being inclined faces. In any case, since the corner part 4 formed between two side faces 33 or the corner part 4 formed between two end parts 331 protrudes outward from the two side faces 33, the water droplets W1 split at the corner part 4 tend to move away and they are unlikely to contact with the corner part.

Thus, the protective layer 3 has the same effects as long as the two faces connected to the corner part 4 form an acute angle even if the entire end face 32 or the side face 33 is not an inclined face or a concave face. That is, it suffices if a part of the end face 32 or the side face 33 constituting a part of the outer surface 31 of the protective layer 3 is an inclined face or a curved face that expands outward as it approaches the corner part 4.

Similarly to the first embodiment, the gas sensor element 1 having such a shape can also be manufactured by, for example, molding.

Figure 20:
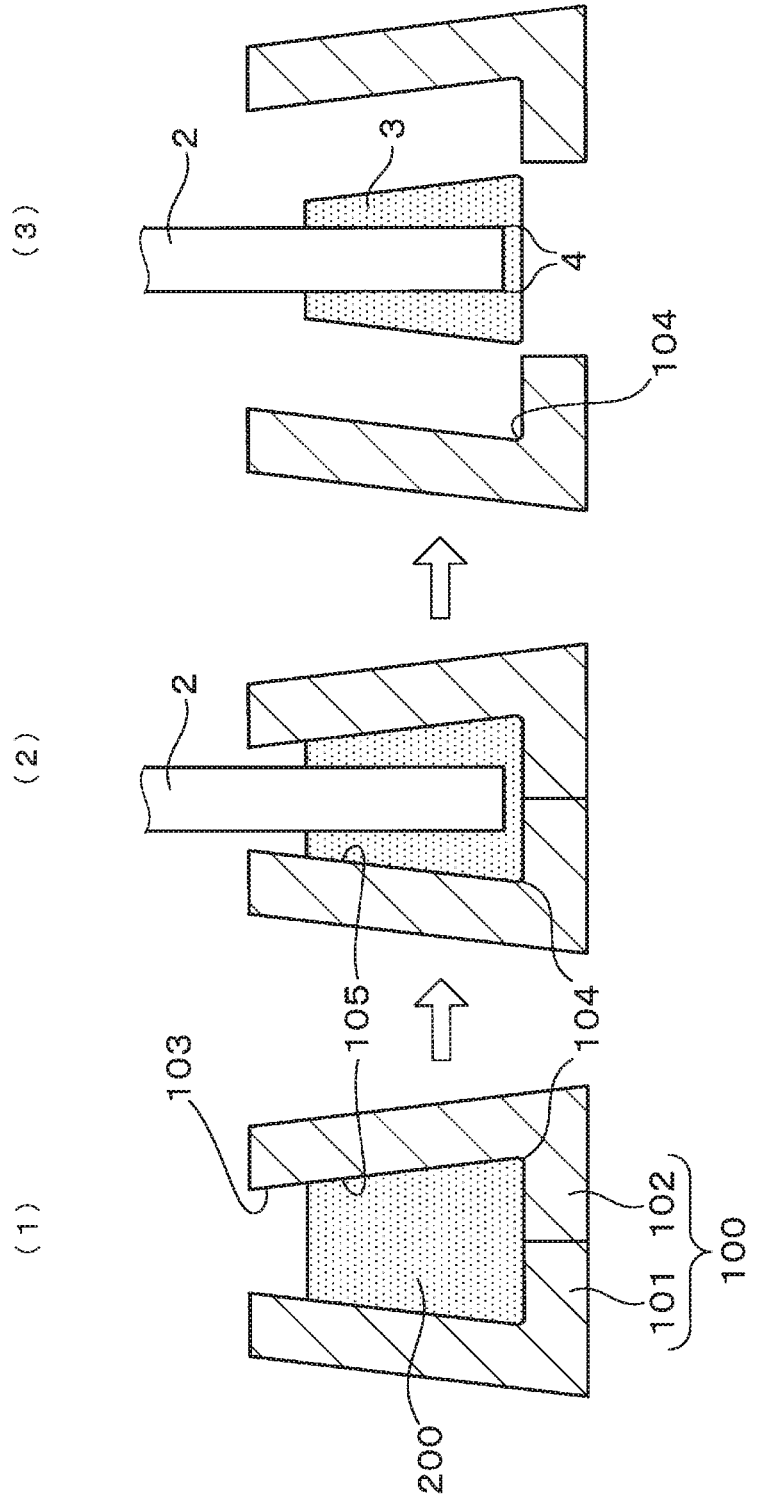
FIG. 20 is a view showing the manufacturing process of the gas sensor element according to the second embodiment.

As shown in FIG. 20, in the step shown in (1), the container-like mold 100 includes two molds 101 and 102 having a split structure, and the hollow part 103 formed at the abutting parts of the two molds 101 and 102 has a shape corresponding to the outer shape of the protective layer 3. Here, the inner side faces 105 of the two molds 101 and 102 are formed as inclined faces that expand as they approach the bottom face, and the inner peripheral edges of the bottoms of the molds are formed to form a C surface shape, so that they form the shape of the corner parts 104 which are inclined inward from the inner side faces toward the bottom face.

A slurry 200 containing a ceramic material for constituting the protective layer 3 is injected into such a mold 100. Then, in the step shown in (2), the element body 2 is inserted into the mold 100 in which the slurry 200 has been injected, and the slurry 200 is temporarily cured after positioning and holding the element body with a jig or the like (not shown). After that, in the step shown in (3), the two molds 101 and 102 are opened to take out the element body 2 covered with the temporarily-cured slurry 200, and the element body is baked (for example, at 1000° C.) to form the protective layer 3.

Test Example 3

Next, samples of the gas sensor element 1 manufactured by the method described above and having different values for the angle θ formed between the end face 32 and the side face 33 of the protective layer 3 were tested to evaluate the influence on element cracking. The samples of the gas sensor element 1 were configured such that the corner part 4 has an effective length L of about 0.9 mm, and the angle θ is an obtuse angle or an acute angle since one or both of the end face 32 and the side face 33 of the protective layer 3 were inclined (that is, Examples 4 and 5). The layer thickness t of the protective layer 3 at the corner part 4 was 0.15 mm.

A water exposure test was performed in the same manner as in Test Example 2. The IL change ratio was calculated as the droplet amount of the water drop W was gradually increased from 3 μL, and the maximum droplet amount at which it is judged that no element cracking occurs (that is, the IL change ratio is 5% or smaller) was determined. The results are shown in Table 2.

TABLE 2

| Ex. No. | L [mm] | Angle [°] | Droplet amount [μL] |
|---------|--------|-----------|---------------------|
| Ex. 4   | 0.918  | 110       | 3                   |
| Ex. 5   | 0.920  | 85        | 8                   |

As can be seen from Table 2, even in Example 4 where the angle θ formed by two faces of the protective layer 3 is an obtuse angle of 110°, if the effective length L of the corner part 4 is as small as about 0.9 mm, the IL change ratio could be suppressed to equal to or smaller than 5% even when the droplet amount was as large as 3 μL (that is, corresponding to a water droplet diameter of 1.79 mm). Further, in Example 5 where the angle θ is an acute angle of 85°, even when the droplet amount was 8 μL which is larger than in the above case (that is, corresponding to a water droplet diameter of 2.48 mm), the IL change ratio could be suppressed to equal to or smaller than 5%, and it can be seen that the effect of splitting water droplets W and reducing the amount of absorption can be further enhanced. When the droplet diameters in Examples 3 and 4 are regarded as the assumed diameters D, the ratios D/L are respectively 1.95 and 2.70.

Third Embodiment

The third embodiment according to a gas sensor element and a gas sensor will be described with reference to FIG. 21. The gas sensor element 1 shown in the above embodiments can be modified by imparting water repellency to the protective layer 3 to further improve water resistance. In order to impart water repellency to the protective layer 3, for example, as described in JP 2016-29360 A specified above, the protective layer 3 may have such a configuration that the Leidenfrost phenomenon can occur, or it may be provided with a hydrophobic film on its surface.

The basic structures of the gas sensor element 1 and the gas sensor S of this embodiment are the same as those of the first embodiment, and their description will be omitted.

Figure 21:
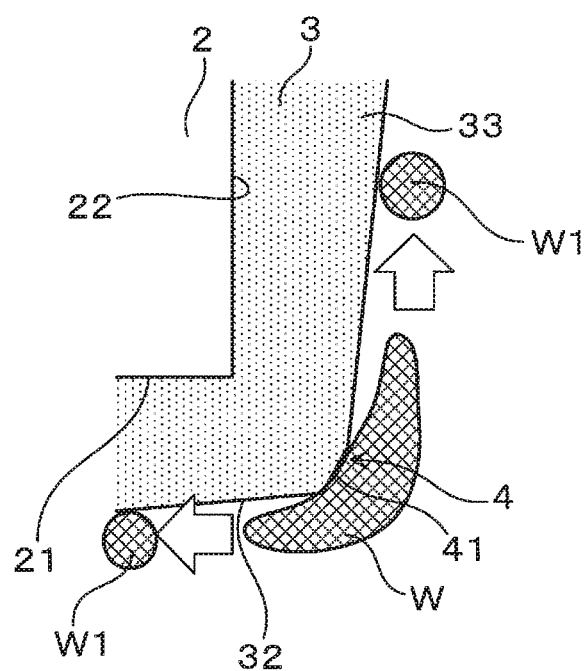
FIG. 21 is an enlarged cross-sectional view of the main part showing the configuration of the protective layer of the gas sensor element according to the third embodiment.

Specifically, the configuration of the protective layer 3 shown in FIG. 21 is similar to that of the second embodiment shown in FIG. 16. The end face 32 and the side face 33 of the protective layer 3 are inclined so as to expand as they move away from the corner part 4, and the angle θ formed by the end face 32 and the side face 33 is an obtuse angle. In such a configuration, for example, a hydrophobic film can be formed on the surface of the protective layer 3 by applying a heat-resistant fluororesin or the like to form a water-repellent protective layer 3. Alternatively, water repellency can be imparted by increasing the thermal conductivity of the ceramic particle layer constituting the surface layer of the protective layer 3 by making this layer relatively dense. For example, the thermal conductivity is preferably in the range of 0.2 to 5 W/mK. An increased thermal conductivity increases the heat flux with respect to the water droplets W, and a film can be formed by thermal boiling which causes the Leidenfrost phenomenon.

Thus, since the protective layer 3 has water repellency, when the water droplet W collides with the corner part 4, the force of adhering to the water droplet contact surface 41 weakens, and the speed of the water droplet W is maintained. This assists the water to leave. Since the water droplets W are prevented from being absorbed inside at the corner parts 4 of the protective layer 3, and the split water droplets W1 are unlikely to be absorbed even when they come into contact with the outer surface 31 again, the water resistance is further enhanced.

Test Example 4

Next, a sample of the gas sensor element 1 was prepared similarly to those in Test Example 3, and water repellency was imparted to the protective layer 3 to evaluate the influence on element cracking. The sample of the gas sensor element 1 was formed in the same shape as that of Example 4 in Test Example 3 described above, and the effective length L of the corner part 4 was about 0.9 mm, and the angle θ formed between the end face 32 and the side face 33 of the protective layer 3 was an obtuse angle of 110°. The layer thickness t of the protective layer 3 at the corner part 4 was 0.15 mm, and further, a hydrophobic film was formed on the surface of the protective layer 3 by applying a heat-resistant fluororesin, and thus Example 6 was obtained.

A water exposure test was performed in the same manner as in Test Example 3. The IL change ratio was calculated as the droplet amount of the water drop W was gradually increased from 3 μL, and the maximum droplet amount at which it is judged that no element cracking occurs (that is, the IL change ratio is 5% or smaller) was determined. The results are shown in Table 3.

The effective length L of the corner part 4 was 0.9 mm, and the angle θ formed between the end face 32 and the side face 33 of the protective layer 3 was an obtuse angle of 110°. The layer thickness t of the protective layer 3 at the corner part 4 was 0.15 mm.

TABLE 3

| Ex. No. | L [mm] | Water repellency | Droplet amount [μL] |
| --- | --- | --- | --- |
| Ex. 4 | 0.918 | No | 3 |
| Ex. 6 | 0.925 | Yes | 10 |

As can be seen from Table 3, Example 6, which was obtained by further imparting water repellency to the protective layer 3 of Example 4 whose angle θ formed by the two faces of the protective layer 3 is an obtuse angle, was able to suppress the IL change ratio equal to or smaller than 5% in the range from a droplet amount of 3 μL (that is, corresponding to a droplet diameter of 1.79 mm) to a larger droplet amount of 10 μL (that is, corresponding to a droplet diameter of 2.68 mm). This indicates that when the protective layer 3 has water repellency, the effect of splitting the water droplets W and reducing the amount of absorption can be further enhanced. When the droplet diameter is regarded as the assumed diameter D, the ratio D/L is 2.90.

Note that the present disclosure is not limited only to the embodiments, and other embodiments can be implemented without deviating from the gist thereof. Further, the structures of the gas sensor element 1 and the gas sensor S are not limited to those shown in the above embodiments, and for example, the configuration of the element cover and other parts can be appropriately changed according to the application. Furthermore, the gas to be measured is not limited to exhaust gas from an automobile engine, and the specific gas component may also be any gas component.

What is claimed is:

1. A gas sensor element for detecting a specific gas component in a measured gas, the gas sensor element being housed in a cover body, and the gas sensor element comprising:

an element body in the form of a long plate having a gas detection part at an end thereof on an end face side in a longitudinal direction; and a porous protective layer covering an outer periphery of the end on the end face side of the element body, wherein an outer surface of the porous protective layer facing an element corner of the element body has a shape with a corner part, the outer surface of the porous protective layer includes, in a cross section, two faces which are connected to each other with the corner part therebetween, the two faces of the porous protective layer being comprised of (i) an end face of the porous protective layer and (ii) one of side faces of the porous protective layer, the end face of the porous protective layer is positioned at an end of the porous protective layer in the longitudinal direction, the corner part has an effective length of the corner part in the cross section, in the cross section including the two faces of the outer surface of the porous protective layer, an angle formed by the two faces of the outer surface of the porous protective layer that meet at the corner part is an acute angle, the corner part is located on an extension line of a line that bisects the element corner, the corner part has a water droplet contact surface including an intersection between the extension line of the line and the outer surface of the porous protective layer, the effective length of the corner part is a distance between two ends of the water droplet contact surface in the cross section including the two faces, the water droplet contact surface is flat, and at least one of the end face and/or the one of the side faces of the outer surface of the porous protective layer is a curved concave face that expands outward from the element body as the curved concave face approaches the corner part, and the corner part protrudes outward from the end face and/or the one of the side faces to form the acute angle formed by the two faces of the outer surface of the porous protective layer.

2. The gas sensor element according to claim 1, wherein the water droplet contact surface has shape change points respectively located in directions toward the two faces from the intersection, and the two ends of the water droplet contact surface are defined at the shape change points.

3. The gas sensor element according to claim 1, wherein the effective length of the corner part is smaller than 1.2 mm and equal to or larger than 0.9 mm.

4. The gas sensor element according to claim 3, wherein a ratio of the effective length of the corner part to a layer thickness of the porous protective layer at the corner part is equal to or smaller than 6 and equal to or larger than 2.

5. The gas sensor element according to claim 1, wherein the corner part protrudes outward from at least one of the two faces of the outer surface of the porous protective layer facing the element corner.

6. The gas sensor element according to claim 1, wherein the effective length of the corner part is 0.8 mm or more and smaller than 1.0 mm.

7. The gas sensor element according to claim 1, wherein the porous protective layer has water repellency.

8. A gas sensor comprising the gas sensor element according to claim 1, further comprising a cylindrical housing supporting an outer periphery of the gas sensor element, wherein an end of the gas sensor element at which the porous protective layer is provided is housed in the cover body attached to one end of the cylindrical housing, and the measured gas is introduced into the cover body through a through hole provided in the cover body.

* * * * *